UNITED STATES PATENT OFFICE.

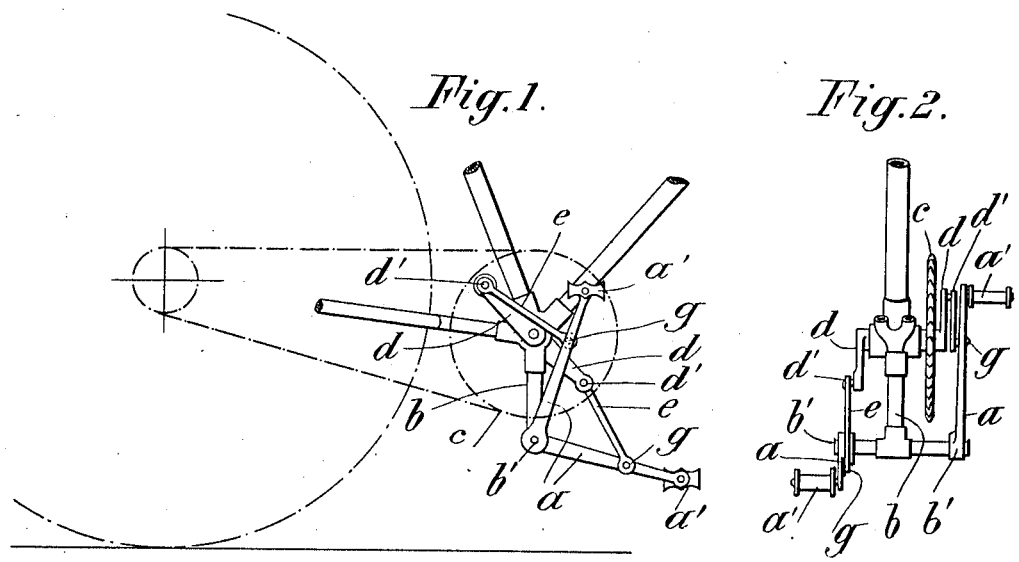

ARCANGELO MANGIAROTTI, OF MILAN, ITALY.

PEDAL MECHANISM FOR BICYCLES.

1,020,299.  Specification of Letters Patent.  Patented Mar. 12, 1912.

Application filed May 6, 1911. Serial No. 625,643.

*To all whom it may concern:*

Be it known that I, ARCANGELO MANGIAROTTI, a subject of the King of Italy, and resident of Milan, Italy, have invented certain new and useful Improvements in Pedal Mechanism for Bicycles, of which the following is a specification.

This invention relates to a novel pedal mechanism for bicycles or similar vehicles, the object of the invention being to provide means to increase the speed of the bicycle.

In the accompanying drawings: Figure 1 is a side elevation of my improved mechanism. Fig. 2 is a rear elevation of the same. Fig. 3 is a diagrammatic view showing two different positions of the pedal levers and the connecting rods.

The mechanism comprises two levers $a$, each of which is provided at its free end with a pedal $a^1$. These levers are pivoted at $b^1$ to a T bracket depending from the frame of the machine.

C indicates a sprocket wheel, on the shaft of which are two crank arms $d$ extending in opposite directions. Rods $e$ are pivotally connected at $d^1$ to the free ends of the arms $d$, and also to the two levers $a$ at the points indicated at $g$. The length and pivotal connections of the levers and the connecting rods $e$, are such that the vertical movement of the pedals imparts a rotary movement to the sprocket wheel, hence the considerable labor and effort is saved the operator in propelling the bicycle. Furthermore, the construction is such as will enable the operator to obtain greater speed than with a construction where it is necessary to compel a full revolution of the pedals.

Claim.

In a bicycle, the combination of a frame including a depending bracket, a shaft, a sprocket wheel mounted on the shaft, oppositely disposed cranks secured to the ends of the shaft, a pair of levers pivoted to the bracket, pedals on the ends of the levers, and connecting rods pivoted to the ends of the cranks and the levers, whereby the cranks are caused to rotate when the levers are vertically depressed.

In testimony whereof I have hereunto set my hand in presence of two witnesses.

ARCANGELO MANGIAROTTI.

Witnesses:
 GIANGIACOMO GUARNIERI,
 P. DE FRANCISCO.

---

Copies of this patent may be obtained for five cents each, by addressing the "Commissioner of Patents, Washington, D. C."